US005335992A

United States Patent [19]

Holl

[11] Patent Number: 5,335,992

[45] Date of Patent: Aug. 9, 1994

[54] METHODS AND APPARATUS FOR THE MIXING AND DISPERSION OF FLOWABLE MATERIALS

[76] Inventor: Richard A. Holl, 4171-C5, Market St., Ventura, Calif. 93003

[21] Appl. No.: 31,334

[22] Filed: Mar. 15, 1993

[51] Int. Cl.[5] .............................................. B29B 1/04

[52] U.S. Cl. ..................................... 366/348; 366/69

[58] Field of Search ..................... 366/79, 76, 78, 80, 366/82, 87, 88, 89, 90, 307, 336, 338, 69, 348; 425/207, 208, 209

[56] References Cited

U.S. PATENT DOCUMENTS

| | | | |
|---|---|---|---|
| 3,685,804 | 8/1972 | Stansfield | 366/89 |
| 3,874,643 | 4/1975 | Lorenian | 366/87 |
| 4,071,225 | 1/1978 | Holl | 366/114 |
| 4,408,725 | 10/1983 | Wenger | 366/79 |

*Primary Examiner*—Robert W. Jenkins

[57] ABSTRACT

New apparatus and methods are provided for the uniform mixing and dispersion of highly viscous flowable pastes, such apparatus comprising a body with a flow passage that is kept full of the material by pumping it under pressure. The passage is of constant flow cross-sectional area along its operative length and the ratio of its dimensions at right angles to one another changes cyclically and repeatedly along its length between a lower value and a higher value. In each stage each increase in ratio produces spreading deformation of the material from a compact mass to a thin sheet moving between closely spaced passage surfaces, and viscous shear in the material, while each decrease returns the moving material to a compact mass; the passage preferably has from 10 to 25 stages. Preferably, a rotatable core member extends through the passage so that it is annular, its rotation increasing the shear in the material above a minimum required for rheological plastic flow to facilitate the flow through the passage. The core member is rotated at a speed within the range 0.05 to 2000 RPM, preferably in the range 0.1 to 100 RPM.

14 Claims, 4 Drawing Sheets

FIG. 6
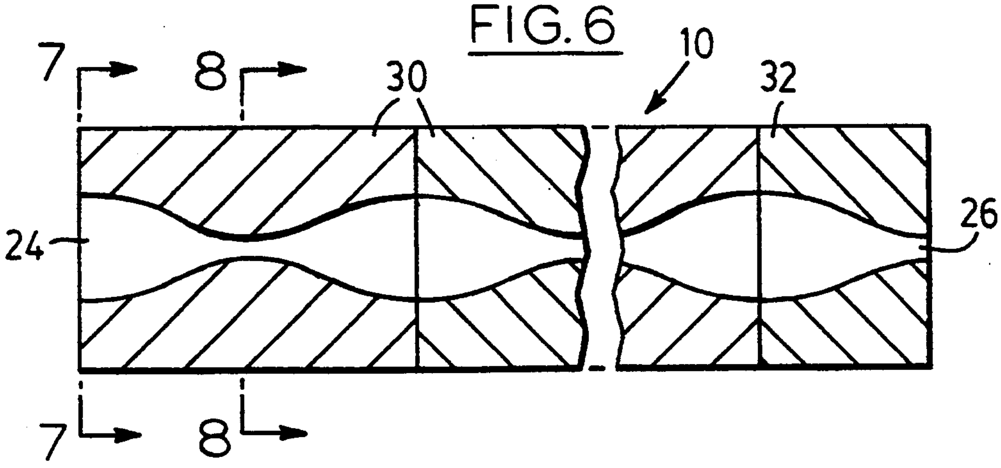
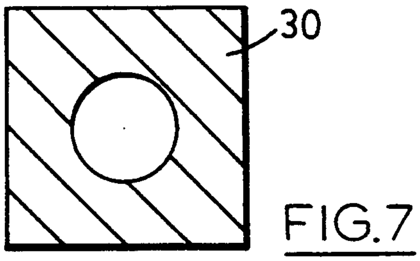
FIG. 7
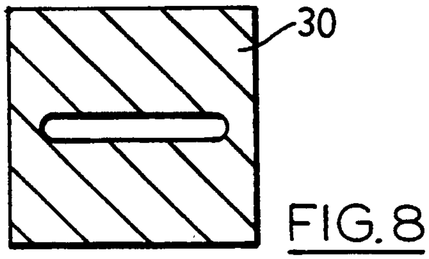
FIG. 8
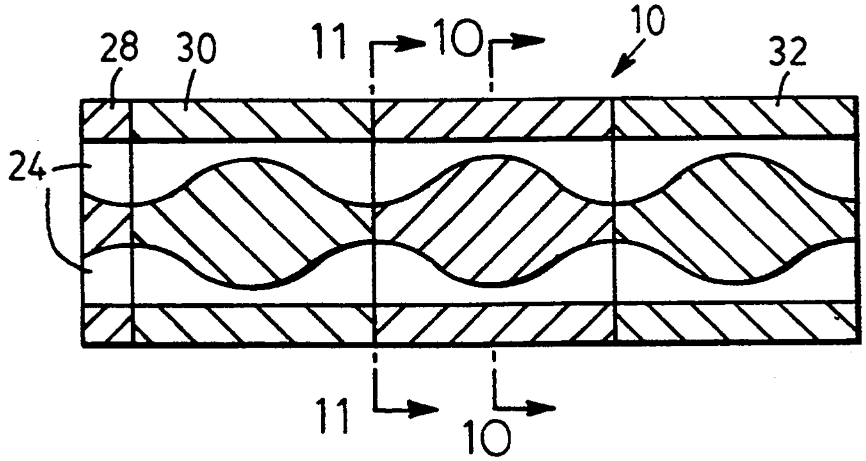
FIG. 9
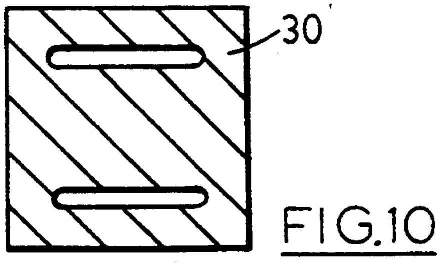
FIG. 10
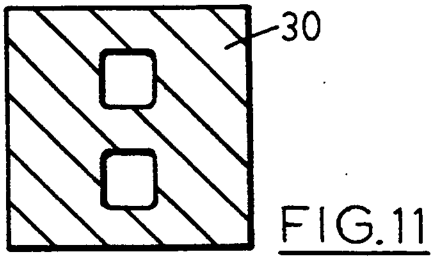
FIG. 11

METHODS AND APPARATUS FOR THE MIXING AND DISPERSION OF FLOWABLE MATERIALS

FIELD OF THE INVENTION

The present invention is concerned with new methods and apparatus for the uniform mixing and dispersion of flowable materials, especially but not exclusively such materials comprising a highly viscous slurry or paste comprising a powdered solid material or materials in a liquid dispersion vehicle, together with any accompanying additives. The invention is also concerned with such new methods and apparatus which are able to produce such uniform mixing and dispersion together with deagglomeration of the powdered material or materials.

REVIEW OF THE PROBLEMS AND THE PRIOR ART

An increasingly important range of industrial processes involve the manufacture of sintered ceramic and metal products, usually requiring for this purpose the production of so-called green ware or bodies from powdered bulk solid material, or mixtures of such materials, which green ware or bodies subsequently are heated to a sintering or fusing temperature, and even to a melting temperature, to form the finished products. An essential step in such processes is the conversion of the dry, powdered starting material to a flowable state in which it can be molded, extruded, etc. to enable the green bodies to be formed. A description of such a conversion process is given, for example, in U.S. Pat. No. 4,965,039, issued Oct. 23, 1990 to The Dow Chemical Company, which discusses the problems of the addition of polymeric binders to inorganic slurries, proposes solutions thereto, and also reviews the role of ball-milling in the formation of the slurries, which is one of the essential steps of the process of forming the green bodies.

It is important for satisfactory production that the initial processing produce a material to be heated that is as uniform as possible in its constitution, and that is as free as possible from physical and chemical flaws and inhomogenities (referred to herein generically as "flaws"), since these determine many critical properties of the final products. Fired or sintered ceramic articles are found to exhibit a number of special types of flaws. A first consists of fine bubble holes which are created during the production of the slip in the ball mill and stirrers. These bubble holes may have sizes in the range about 1–20 micrometers and the bubbles which cause their formation cannot be removed from the viscous slurry by known methods such as filtering, the application of a vacuum, or the long time effect of buoyancy, with or without slow stirring. These bubble holes are among the main participants causing unwanted residual porosity in the fired body. As an example, the sintered alumina substrates supplied to the market for printing thick film electronic circuits thereon are frequently found to have as many as 5,000 such fine residual bubble holes per square cm of surface. Another of such flaws is the residual porosity caused by holes at the triple-points of spray-dried granules found after sintering roll-compacted alumina substrates, these triple-point holes being of similar size to the bubble holes, and appearing in similar numbers per square cm. Yet another special flaw found in fired ceramic bodies made from cold pressed spray-dried granules is referred to as "knit-lines". These are a web or network of seam lines of lower density formed at the contact areas between butting particles during the cold pressing of the green parts.

It is known that with ceramic products any such flaws present in the green ware are amplified during the firing, and subsequent fractures in the finished products are almost always initiated at the regions containing such flaws. The flaws also have deleterious effects on properties such as thermal shock resistance, dielectric strength, thick film metallization and printed circuit performance, and for ceramic products intended for high strength applications flaws as small as 10 micrometers may still be too large. Because of the difficulty with existing manufacturing methods of avoiding small dimension flaws, ceramic parts for high strength applications have a low production yield and may require proof testing of every part, considerably increasing their cost.

The manufacturing methods usually employed hitherto for the production of sintered ceramics or metal parts basically involve stirring together predetermined amounts of binders, surfactants and functional agents in a liquid solvent (usually water but which may be non-aqueous), until they are completely dissolved. During or after this mixing step the powdered base material is added to the dispersion vehicle constituted by the resultant solution while stirring continuously until it is fully dispersed therein. The stirring usually is carried out in mixing apparatus such as ball mills, or high shear mixing vessels employing rotating stirring devices, etc. so that the powdered material is also partially deagglomerated. The relative proportions of liquid vehicle and powdered material are such that the dispersed powdered solids content is maintained as high as possible while a smooth slurry is formed. Such a slurry is usually referred to in the ceramic industry as a "slip". The continued stirring (aging) of the slip after the addition of all of the ingredients in order to obtain adequate pre-dispersion and partial deagglomeration may require anywhere from two hours to four days, depending upon the equipment available and the end quality of slip that is required. The slip is then partially dried, the four principal methods used being spray-drying, filter-pressing, slip-casting, and tape-casting, to achieve a more-or-less dry, leather-like appearing material, which nevertheless is of sufficiently pasty or flowable consistency that it can be extruded, molded, roll-compacted or punched to form the green parts that subsequently are sintered, the sintering removing the residual moisture, binders, and functional agents. Ideally the sintered product, whether of polycrystalline ceramic or metal, remains physically and chemically completely homogeneous, and is pore and residue free, with no impurities introduced during the mixing and drying steps.

It has been understood by those skilled in this art that the successful production of ceramic and powdered metal parts requires careful control of the particle size distribution of the starting material and careful control of the grain or crystallite size distribution of the sintered material. One of the purposes of the relatively lengthy ageing step is to ensure that the particles of different sizes and density, and any added functional materials such as dispersants, binders, etc., are distributed as uniformly as possible throughout the material, but all of the subsequent drying methods mentioned have the problem that inherently they reintroduce non-uniformity in the dried material, caused by liquid migration and reagglomeration during the drying step.

Thus, in spray-drying the slip is pumped through a nozzle to form a spray which is dewatered by heat and reduced pressure. The spray is of random droplet size, and the differently sized droplets are converted into granules of non-uniform softness or hardness, the smaller granules becoming harder because of over-heating as a result of their water content disappearing before that of the larger droplets has been able to fully evaporate, leading to non-uniformity in their densities. In addition, there is always a degree of size segregation that occurs during granule handling.

When a slurry is press-filtered the exiting moisture must pass out through the remainder of the body to reach its surface and it tends to carry the finer particles with it while leaving the larger particles behind, so that the dewatered material is partially segregated with an excess of finer particles in its outer portion, and an excess of larger particles in its centre.

In tape-casting the slurry is deposited on a moving conveyor in the form of a thin film or strip that is passed through a drying chamber; the resulting dried strip upon removal is usually self-supporting to the extent that it can be rolled for storage and subsequent processing. The evaporating vapors leave the tape between solids particles that initially are highly mobile, and which tend to rearrange their positions freely to result in small vapor vent channels that then become consolidated, leading to nonuniform density distributions and nonuniform drying and sintering shrinkages so that again partial segregation and non-uniformity are obtained.

Pastes made of dispersions of powdered solids in a liquid vehicle and which have then had their liquid content reduced by any of the conventional methods described above to make them capable of extrusion, injection molding, etc. are of very high viscosity. A high viscosity is also needed when compounding in order to achieve the necessary high internal shear stress for efficient dispersion and mixing. Conventionally they are being processed in heavy-duty mixing equipment, such as pug mills, extruders, kneaders, roller mills, double blade or dough mixers, single or double-auger continuous compounders, and planetary screw compounders. Heavy duty mixers and compounders (except for roller mills) accomplish only limited deagglomeration and have the disadvantage that they are prone to pick up relatively high amounts of contaminants consisting of particles abraded from the walls and mixing blades. Roller mills are quite efficient in deagglomeration, but are of very limited mixing and homogenization efficiency. Thus, to operate most effectively as a deagglomerating device for these viscous pastes a roller mill must use high pressure in the narrow nip space between the rolls, thereby creating the necessary high shear when feeding highly viscous pastes. The higher the viscosity the greater is the degree of shear which is developed in the roll nip. The greater the shear the higher the degree of dispersion and deagglomeration that can be achieved. Also, the smaller the nip spacing between the two rolls the higher the shear that can be obtained, but a smaller nip spacing corresponds with a smaller throughput through the mill. The result is that roller mills have a limited throughput for an acceptable degree of dispersion and deagglomeration and also suffer from a limited mixing capability, so that batches for such a mill preferably are already pre-mixed. A further major shortcoming of roller mills is that only an extremely narrow band or line of the material in the nip (usually only a few micrometers wide) is subjected to the rolling pressure, while ideally the entire batch to be processed should be subjected simultaneously to the high shear pressure.

Extrusion processes are technically and industrially important but prior art extruders produce a number of persistent defects, regardless of the type of prior compounding, compression, mixing or conveying that has been used. For example, the drag of the extrusion dies tend to produce shear planes or cracks that extend from the surface of the extruded column and cut across the flow lines into the interior of the column; one or both of these patterns may appear as cracks in the finished product. Auger extruders have the advantage over piston extruders that they permit continuous extruding, but have the disadvantage that they extrude a column exhibiting coil or twist phenomena, resulting in distorted extrusion geometries and coiled knit planes where the coils of paste delivered into the mold cavity were pressed together. This type of extrusion therefore has the potential of producing weakness planes that may develop into flaws in the finished products, and lamination cracks, surface and edge tearing are the most common defects associated with paste extrusion. Another problem associated with extrusion processes involving fine particle pastes is segregation of the liquid component which tends to collect toward the surface of the extruded column. For example tests have shown differences of liquid (water) content of 13.4% at the column core and 14.6% at the periphery, and resultant variable volume drying shrinkage from 9.3% to 7.5% at different locations in one plane of the cross-section. A number of attempts have been made to correct this problem of auger extruders, such as the so-called delaminator, consisting of two steel rings rotating inside the barrel of the extruder downstream from the auger, the rings rotating on shafts which are disposed at 90° to each other and to the extruder axis, the extruding body passing them in succession so that circular cuts are made across the column in four directions. The device however proved to be only partially successful in the less demanding application of the manufacture of clay extrusions.

DEFINITION OF THE INVENTION

It is the principal object of the invention to provide new methods and apparatus for the uniform mixing and dispersion of flowable materials, particularly such materials having the form of highly viscous flowable pastes.

It is a particular object to provide such methods and apparatus that enable the continuous mixing, dispersion, deagglomeration, homogenization and deaerating of materials comprising finely powdered solid materials of mainly sub-micrometer size distribution in a liquid dispersion vehicle and being in the rheological state of a stiff paste.

In accordance with the present invention there is provided apparatus for the mixing and dispersion of flowable materials, the apparatus comprising:

a body member having therein a passage for receiving the flowable material, the passage having an inlet thereto for the material and an outlet therefrom;

the apparatus being used in combination with moving means connected to the passage inlet and for moving the material through the passage under pressure and so as to maintain the passage full of material along its operative length;

wherein the passage is of substantially constant transverse cross-section area along its operative length and the ratio of the dimensions at right angles to one another of successive transverse cross-section areas changes cyclically and repeatedly along its operative length from a value within a lower range of values to a value within a higher range of values, and vice versa, each increase in said ratio being accompanied by cold superplastic spreading deformation of the material from a relatively compact mass thereof and corresponding pressure induced viscous shear in the moving material, and each decrease in said ratio returning the moving material to the form of a relatively compact mass, thereby producing the required mixing and dispersion within the moving material.

Also in accordance with the invention there is provided a method for the mixing and dispersion of flowable materials, the method comprising:

passing the material to be mixed and dispersed through a body member having therein a passage for receiving the flowable material, the passage having an inlet thereto for the material and an outlet therefrom;

the material being moved through the passage under pressure and so as to maintain the passage full of material along its operative length;

the passage being of substantially constant transverse cross-section area along its operative length and the ratio of the dimensions at right angles to one another of successive transverse cross-section areas changing cyclically and repeatedly along its operative length from a value within a lower range of values to a value within a higher range of values, and vice versa, each increase in said ratio being accompanied by cold superplastic spreading deformation of the material from a relatively compact mass thereof and corresponding pressure induced viscous shear in the moving material, and each decrease in said ratio returning the moving material to the form of a relatively compact mass, thereby producing the required mixing and dispersion within the moving material.

The passage will usually have as a minimum 2 separate successive stages, and preferably has from 10 to 25 separate successive stages, more preferably from 10 to 15 stages, where each stage includes an increase of the ratio from a minimum value to a maximum value and an immediately successive decrease of the ratio from the maximum value to a corresponding minimum value.

Preferably, the lower value for the ratio is in the range 5:1 and 30:1, and the higher value is in the range 100:1 to 1,000:1.

Preferably, the body member has a core member extending through at least the operative length of the passage and the passage surrounds the core member to be of corresponding annular shape.

Preferably, particularly for use with materials of high viscosity, the core member is rotatable about a corresponding rotation axis within the passage to induce a minimum shear in the moving material and thereby facilitate its flow through the passage under the applied pressure.

Preferably, the core member is rotated at a speed within the range 0.1 to 100 RPM.

In a particular preferred embodiment the passage is of circular annular cross-section about a longitudinal axis along its operative length with cyclic repeated portions of increased and decreased radius and the passage has mounted therein a core member which is also of circular cross-section along its operative length about the longitudinal axis with cyclic repeated portions of increased and decreased radius that register respectively with the increased and decreased radius passage portions so that the portions of the annular passage of minimum ratio are formed between the registering portions of the passage and core member of minimum radius, and the portions of the annular passage of maximum ratio are formed between the registering portions of the passage and core member of maximum radius.

DESCRIPTION OF THE DRAWINGS

Methods and apparatus that are particular preferred embodiments of the invention will now be described, by way of example, with reference to the accompanying diagrammatic drawings wherein:

FIG. 6 is a longitudinal cross section similar to FIG. 2 of an apparatus which is another embodiment of the invention;

FIGS. 7 and 8 are respective cross sections taken on the lines 7—7 and 8—8 of FIG. 6;

FIG. 9 is a longitudinal cross section similar to FIG. 2 of an apparatus which is a further embodiment of the invention; and FIGS. 10 and 11 are respective cross sections taken on the lines 10—10 and 11—11 of FIG. 9.

DESCRIPTION OF THE PREFERRED EMBODIMENTS

Figure 1:
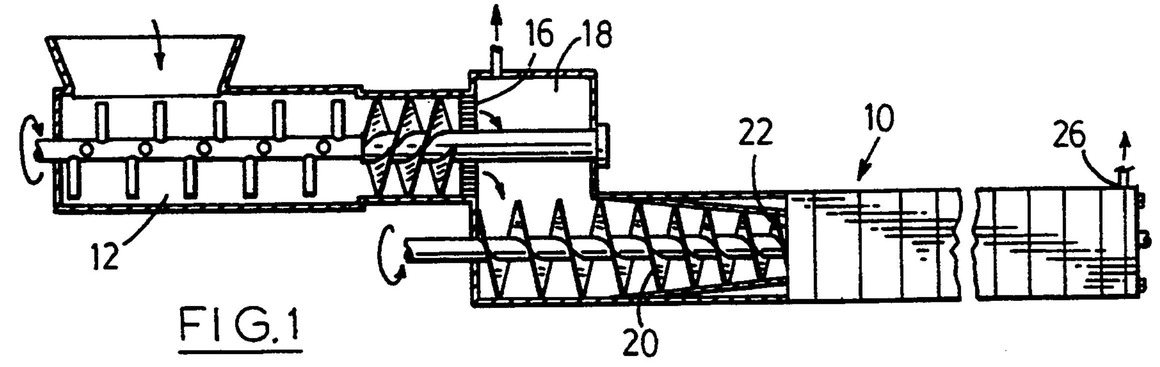
FIG. 1 is a side section through a typical combination pug mill and extrusion auger employed to feed material under pressure to apparatus of the invention, and showing also an apparatus of the invention disposed to receive material therefrom.

The methods and apparatus of the invention are particularly applicable to the manufacture of the advanced ceramic materials now used in industry, and the production of slurries and pastes thereof is described, for example, in my application Ser. No. 07/842,989, filed Feb. 28, 1992, and its continuation-in-part Ser. No. 08/015,796, filed Feb. 10, 1993, the disclosures of which are incorporated by this reference.

Briefly, typically a slurry is formed using a powdered material, or a mixture of powdered materials, a liquid dispersion medium, surfactants and other suitable functional additives, such as binders, plasticizers and lubricants. The average particle size of the powdered materials and grain size of the sintered grains should be less than one micrometer if superplastic forging of the sintered ceramic materials is required. The dispersion medium and the resultant slurry may be aqueous or non-aqueous, although aqueous slurries are usually preferred. The methods of production of such slurries, whether aqueous or non-aqueous, are well known to those skilled in the production of sintered ceramic materials and need not be further described.

Prior to the formation of the slurry the powdered solid particles usually consists of agglomerations of many of the fine particles, so that they are no longer all of one micrometer size or less, and this must be corrected, as described above, by stirring and/or grinding the slurry using any of the apparatus conventionally used for this purpose, such as ball or rod mills and high shear roller mills. At the end of this step the slurry forming apparatus will usually not have produced sufficient physical uniformity in the slurry due to incomplete dispersion of the primary particles in the agglomerates, and it may have produced chemical non-uniformity with the surfactant distributed non-uniformly over the very high surface area of the finely powdered solid material. One way of improving this chemical uniformity is to subject the slurry to the effect of intense ultrasonic energy, preferably in a reverbatory ultrasonic mixing (R.U.M.) apparatus as described in my U.S. patent Ser. No. 4,071,225, the disclosure of which is incorporated herein by this reference. The effect of the R.U.M. apparatus is also to help deagglomerate and produce more physical uniformity to the extent that in some processes the prior stirring and/or grinding operation may not be needed.

The slurry may if necessary be subjected to a further deagglomerating step wherein it is passed through one or a series of special mills which are the subject of my prior patent application Ser. No. 07/935,277, filed Aug. 26, 1992, the disclosure of which is incorporated herein by this reference. Such apparatus is capable of processing relatively thick slurries of sub-micrometer particles in minutes that otherwise can take several days in conventional high shear mixers and ball or sand mills.

The thoroughly dispersed slurry that has been obtained now has its liquid content decreased; this decrease is produced for example using a filter press, and is carried out until a solids content of at least 70%–92% by weight is obtained. The specific solids content will of course vary from material to material, and should be such that the dewatered slurry can take the form of so-called filter cakes. It is preferred to remove as much liquid as possible, since eventually it must all be removed in the firing or sintering step, but a lower limit is set by the need to be able conveniently to handle and process the stiff pasty material. The manner in which filter-pressing produces a non-uniform cake is described above, and the desirable physical uniformity is now restored by employment of the present invention.

Apparatus 10 for carrying out the invention typically is fed with the pasty material under the pressure required to move it through the apparatus using a feed assembly as illustrated by FIG. 1, comprising in succession a pug mill 12, a de-airing auger 14 and a shredder 16, the latter discharging into a chamber 18 in which a vacuum is drawn to remove any entrained air. The bottom of the chamber 18 contains an extrusion auger 20 which generates the necessary pressure and feeds the material into the apparatus 10 through an outlet 22.

Referring now to FIGS. 2–5, this first embodiment of the invention consists of an elongated body member providing a correspondingly elongated material flow passage having an inlet 24 thereto and outlet 26 therefrom. For convenience in manufacture the body member is assembled from an inlet end block 28, a plurality of similar intermediate blocks 30, and two outlet end blocks 32 and 34, all of which are butted face-to-face and held tightly together against leakage under the effect of the internal pressure by heavy elongated tie bolts 35. A bore is formed in the registering blocks 28–34 and provides the radially outer wall of the flow passage. This bore is of circular transverse cross-section along its length, has a longitudinal axis 36, and is of approximately sinusoidal profile in longitudinal cross-section of the body member, the bore thus varying in radius uniformly cyclically, repeatedly and progressively along its length from a minimum value R1 (FIG. 3) to a maximum value R2 (FIG. 4); for ease of manufacture the maximum value is located at the butting faces of the blocks. The inlet 24 at the block 28 is circular and of minimum radius, while the outlet 26 at the junction of the two blocks 32 and 34 is thin and elongated transversely to the length of the apparatus, so that the material exits from the apparatus in any desired cross-section, for example in the form of a thin flat ribbon 38, which is delivered to a suitable transport and transfer structure (not shown), by which it is in turn supplied to subsequent processing stations of the process.

Figure 4:
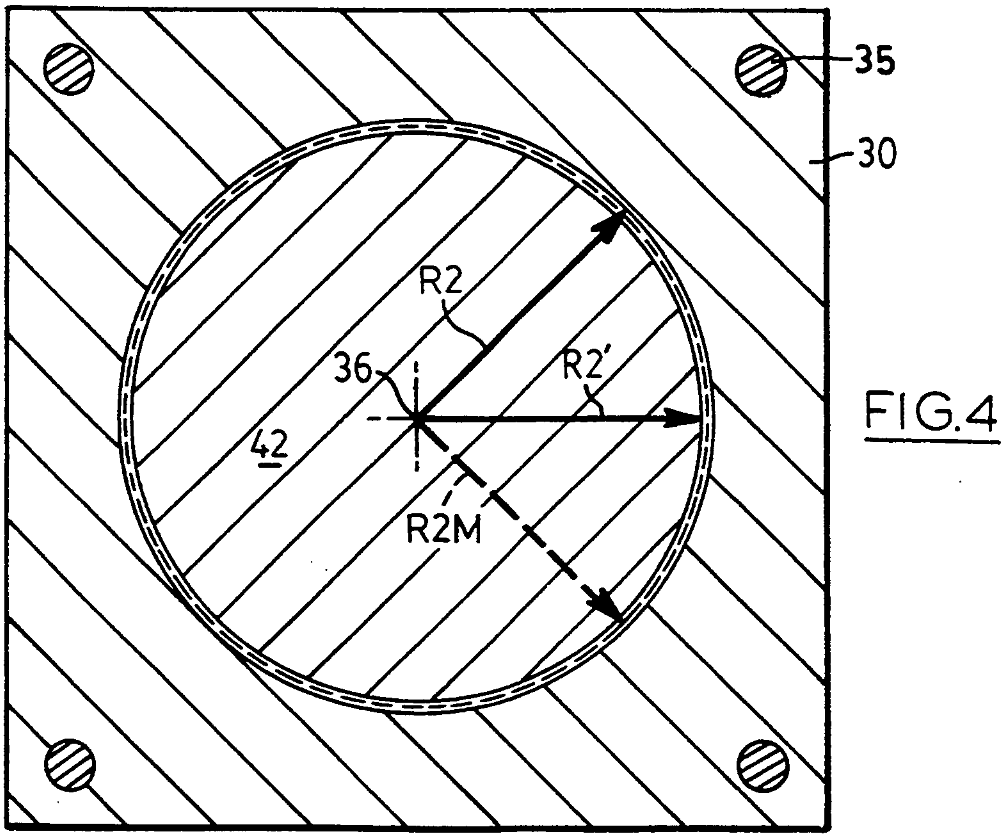

In this embodiment the flow passage proper is of annular transverse cross-section along its operative length, i.e. except for the portion Just before the outlet 26, its radially inner wall being provided by the radially outer surface of an elongated core member 38 mounted therein for rotation about the axis 36 by a sealed bearing (not shown) at the outlet end of the apparatus and is provided with any suitable speed controllable drive means (also not shown). The nose of the core member protrudes into the extruder outlet and is tapered to ensure streamline flow into the passage; a support bearing is not required at this end since it is an inherent characteristic of a pressurized flow completely filling the passage that it will always try to flow evenly and maintain a uniform radial spacing of the core member from the bore wall. As with the bore the core member also varies in radius uniformly cyclically, repeatedly and progressively along its length from a minimum value R1′ (FIG. 3) to a maximum value R2′ (FIG. 4). In practice the core member will usually be machined as an integral member, but may be regarded as consisting of a central shaft 40 having along its length a plurality of uniformly spaced radially outwardly extending discs 42, each of which extends into a respective portion of the bore of maximum radius. The junctions between the discs and the shaft are smoothly curved so as to obtain a longitudinal profile of the core member that is also approximately sinusoidal, and that registers with the profile of the bore, the spacing between the facing walls being such that the flow passage has a substantially constant cross section flow area, and a correspondingly constant flow capacity, along its entire length from the inlet to the outlet. As is apparent, in order to obtain such constant flow the difference in radii of the bore and the core member must change uniformly cyclically, repeatedly and progressively along the length of the apparatus.

For convenience in description at any point along its length a transverse cross section of the annular passage may be considered as a slot of width (circumference) 2PiRM or 2PiRM′, where RM and RM′ are the respective mean radii, as given by the respective relations R1+R1′/2 and R2+R2′/2, and of respective height R1-R1′ and R2-R2′ such a slot having minimum and maximum ratios of the dimensions at right angles to one another of the respective cross section area given by the respective relations:

$$\text{Ratio(Min)} = 2\text{Pi}(R1+R1')/R1-R1' \text{ (as at FIG. 3) and}$$

$$\text{Ratio(Max)} = 2\text{Pi}(R2+R2')/R2-R2' \text{ (as at FIG. 4).}$$

This ratio of the slot, as defined above, changes uniformly cyclically, repeatedly and progressively along the length of the apparatus between these minimum and maximum values as the respective profiles of the body and core members change.

In this particular preferred embodiment therefore the flow passage is of circular annular cross-section about the longitudinal axis 36 along its operative length with cyclic repeated portions of increased and decreased radius and the core member, which is also of circular cross-section along its operative length about the longitudinal axis with cyclic repeated portions of increased and decreased radius, has those portions registering respectively with the increased and decreased radius passage portions, so that the portions of the annular passage of minimum ratio are formed between the registering portions of the passage and core member of minimum radius, and the portions of the annular passage of maximum ratio are formed between the registering portions of the passage and core member of maximum radius.

The pasty material enters the apparatus 10 in a relatively compact bulk or mass form at a point of minimum ratio, and the effect of this special passage conformation is that the material is then subjected to a cold superplastic spreading deformation which converts it into a thin sheet form at the point of maximum aspect ratio, and subsequently is converted back to the bulk or mass form at the next point of minimum ratio, this conversion between the two different states proceeding uniformly, cyclically, repeatedly and progressively along the length of the apparatus until the material discharges from the passage. The majority of the mixing and dispersion takes place over the portions of the passage where the ratio increases and where the ratio is in a range about its maximum value, the latter being where the material is in its correspondingly thinnest sheet form. At these locations in the passage the paste stream is subjected to the simultaneous effects of the high pressure moving the material through the passage and the high shear stress (high because of the high viscosity of the stiff paste) as it is forced through the narrow passage in contact with the congruently curved passage walls, this contact causing the formation of vortices in the body of the material as it is dragged in contact with the closely spaced walls which retain the boundary layers against such movement. At these locations the material is also subjected to the best possible deagglomerating action of agglomerate rubbing against agglomerate at a low to medium strain rate while in a condition of high viscous shear, the sheet thereafter being returned to the relatively compact mass form to thoroughly mix it together, without changing its flow cross-sectional area and avoiding the creation of any dead spaces in the flow passage, so as to permit the whole process to be repeated in the next stage until the required processing has been obtained.

Figure 5:
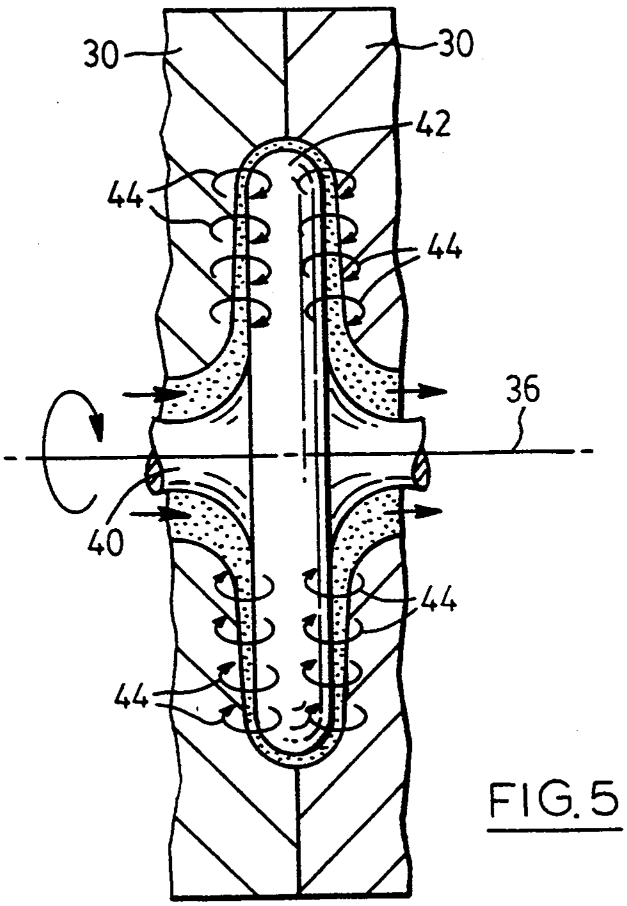
FIG. 5 is a cross section similar to FIG. 1 of a single stage of the apparatus, illustrating a typical flow of the material through the stage.
Figure 2:
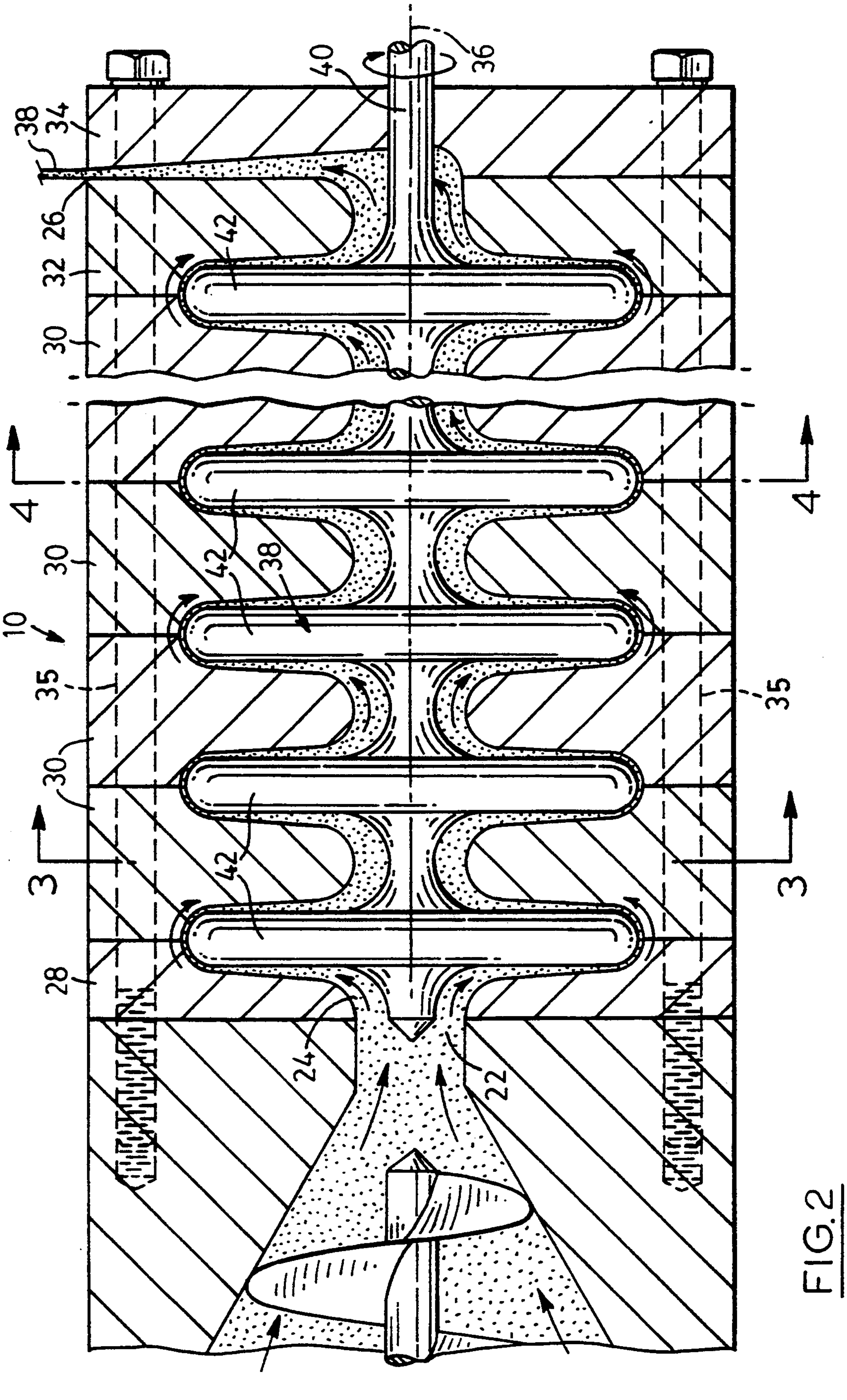
FIG. 2 is a longitudinal cross section through an apparatus which is a first embodiment of the invention.
Figure 3:
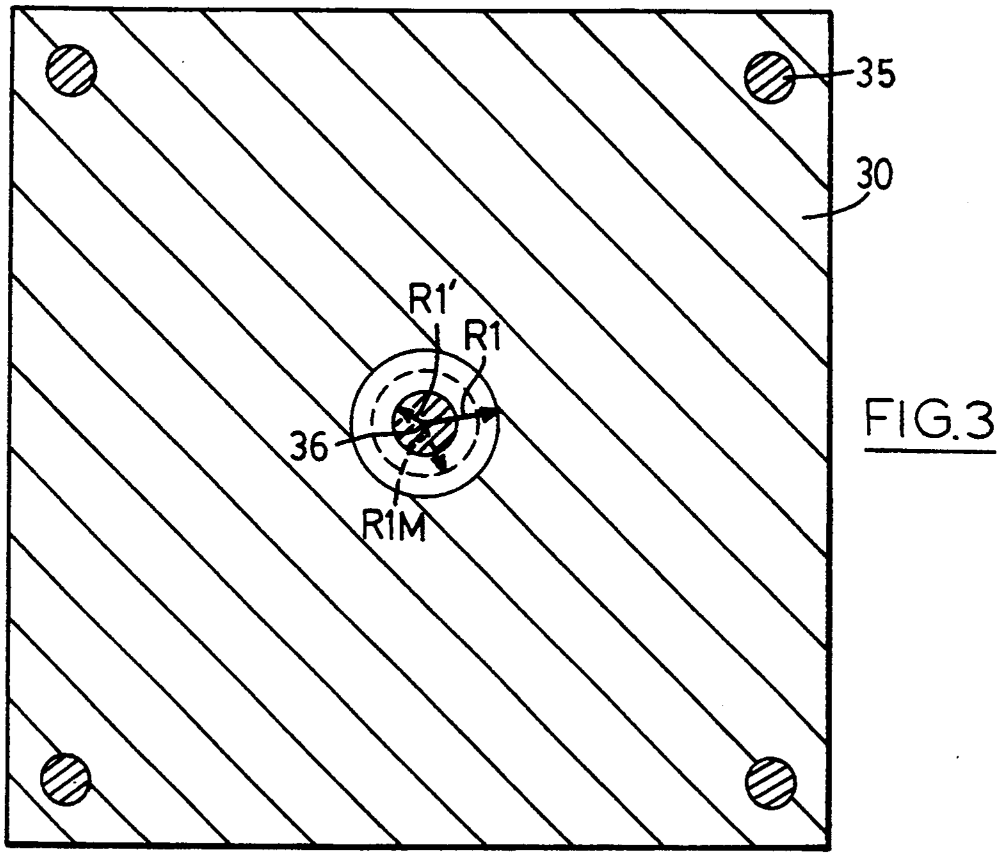
FIGS. 3 and 4 are respective cross sections taken on the lines 3—3 and 4—4 of FIG. 2.

It will be seen that mixing, deagglomeration, dispersing, homogenization and deaerating of the stiff pasty material can take place while the core member is stationary, but all of these effects are substantially improved by rotating the core member about its axis at least at a minimum speed of rotation such that the paste is subjected to a corresponding minimum strain such as to produce, if necessary, the so-called "Bingham" plastic flow. Thus, the thick slurries and pastes characteristic of the ceramics industry are usually of rheological character, namely that with the application of a strain to make them flow which is below a threshold value they flow only with difficulty, but with the application of strain above that minimum threshold value they quite suddenly and discontinuously become much less viscous and much more readily flowable, so that the pressure required to move them through the passage at a particular rate of flow is correspondingly reduced. Another important effect of the core member rotation is illustrated by FIG. 5, showing the transverse vortices (indicated by arrows 44) that are produced in the longitudinally flowing material, increasing the required shear stress and rendering it three-dimensional, so that the entire bulk of the thin sheet of material is subjected to stress both longitudinally and transversely. The core member rotation can also be used to control the strain rate to which the material is subjected. Thus, any rotation of the core member will increase the strain rate above the value that is created solely by the movement of the material through the passage under pressure, with a corresponding increase in effectiveness of deagglomeration, mixing etc,, although in practice it will usually be preferred to increase the strain rate above the minimum value needed to obtain plastic flow. The range of speeds at which the core member needs to be rotated is therefore relatively low and will usually be in the range 0.05 to 2000 RPM, preferably in the range 0.1 to 100 RPM. It will also be noted that with the disc configuration illustrated the core member does not directly apply any forward propulsion to the material, but does assist by facilitating the propulsion provided by the pressure source.

The passage will usually have as a minimum 2 separate successive stages, where each stage includes an increase of the ratio from a minimum value to a maximum value and an immediately successive decrease of the ratio from the maximum value to a corresponding minimum value. The number of stages provided is correlated with the viscosity of the material to be treated, the amount of mixing, dispersion, etc. that is required for the particular material, and the size of apparatus that is chosen, this last also affecting the output obtained from the apparatus. Thus, the minimum number of two stages will usually be used with materials requiring minimum processing, and with apparatus having annular passages of largest diameters; such apparatus will usually have minimum ratios towards the upper end of the preferred range in order to obtain the maximum effect in each stage. For processes and apparatus particularly intended for processing ceramic slurries and pastes it is preferred to use from 10 to 25 separate successive stages, more preferably from 10 to 15 stages, It is believed by me at the present time, although I do not intend to be bound by this explanation, that the highly effective combined mixing and/or deagglomeration action giving such effective dispersion with a pasty mass results from the effects of the above described three-dimensional high shear stress at moderate strain rates produced between the congruent walls at the passage portions of the higher range of ratios as the material moves under pressure through the passage, and as it is further strained by the slow rotation of the core member, facilitated by the generation of different velocities within the material as it is forced from the compact mass form to the thin sheet form, these velocities being higher in the middle of the body of the material where it is free to flow and lower adjacent the passage surfaces where it tends to be retained by these surfaces, thus producing a radially spiralling movement in the material which is also rolled and mixed three-dimensionally throughout the body of the material under very high pressure and shear. The relatively slow linear motion of the material through the passage, and of the rotating core member surfaces relative to the congruent bore surfaces, is believed to be necessary to enable this rolling and mixing motion to take place and to produce the desired cold superplastic deformation that has been found to be surprisingly effective in obtaining a near defect-free and uniformly submicrometer grain structure in sintered ceramic articles, making expensive finishing operations such as hot isostatic pressing and close tolerance machining unnecessary.

Such continuous press mixing operations, as employed with the ceramic materials which are their present applications, will result in a mass of uniformly dispersed, deagglomerated and mixed sub-micrometer pasty material, which conveniently is thereafter subdivided to form green bodies each of the size and at least approximate shape required for the final articles. For example, if the mass exiting from the outlet 26 is sufficiently thin it can be cut directly into plates of the required size and shape. If this is not possible then the resultant rod or strip is cut into portions which preferably are transfer molded to be of the required size and shape.

The following table gives three specific examples of apparatus intended for the processing of ceramic materials:

| | Ex 1 | Ex 2 | Ex 3 |
|---|---|---|---|
| Extruder exit area sqcm | 2.25 | 2.25 | 9.0 |
| Passage flow area sqcm | 1.77 | 1.77 | 7.0 |
| Min bore radius (R1) cm | 1.25 | 1.25 | 1.8 |
| Min shaft radius (R1') cm | 1.0 | 1.0 | 1.0 |
| Min mean radius cm | 1.125 | 1.125 | 1.4 |
| Min slot height cm | 0.25 | 0.25 | 0.8 |
| Minimum Ratio | 28:1 | 28:1 | 11:1 |
| Max bore radius (R2) cm | 3.0 | 6.0 | 6.0 |
| Max disc radius (R2') cm | 2.9 | 5.95 | 5.81 |
| Max mean radius cm | 2.95 | 5.975 | 5.905 |
| Max slot height cm | 0.10 | 0.05 | 0.19 |
| Maximum Ratio | 185:1 | 750:1 | 195:1 |
| Ratio Min/Max Ratios | 6.6:1 | 26.8:1 | 17.7:1 |

The minimum ratio will usually be in the range 5:1 to 30:1, more usually in the range 10:1 to 20:1, while the maximum ratio will usually be in the range 100:1 to 1,000:1, more usually in the range 150:1 to 800:1; it may be noted that in Example 2 with a maximum ratio of 750:1 the slot height of 0.05 cm is as small as is practical with thick ceramic pastes if adequate throughput is to be maintained.

Although the invention has been described and discussed in connection with the mixing and dispersion of thick ceramic slurries and pastes, it is of general application to the mixing and dispersion of other materials, including materials of much less viscosity than that of pastes. Since the beneficial effect of high viscosity in the high ratio portions of the passage is reduced as the viscosity reduces, apparatus for use with lower viscosity materials will usually require more stages, higher maximum ratios, and higher rotational speeds for the shaft, all of which are possible because of the easier flows that are obtained.

FIGS. 6–8 illustrate another simpler embodiment of the invention intended for more viscous materials, in which a core is not used and the changes in ratio are relied upon solely for mixing, dispersion and deagglomeration. FIGS. 9–11 illustrate a further simpler embodiment of the invention, again intended for very high viscosity materials, in which a core is provided but is fixed and not rotatable, so that as with the embodiment of FIGS. 6–8 only the changes in ratio are relied upon for the required mixing and dispersion. The reduction in effectiveness resulting from the core not being rotatable can be compensated, at least in part, by increasing the number of stages.

I claim:

1. Apparatus for the mixing and dispersion of flowable materials, the apparatus comprising:

a body member having therein a passage for receiving the flowable material, the passage having an inlet thereto for the material and an outlet therefrom;

the apparatus being used in combination with moving means connected to the passage inlet and for moving the material through the passage under pressure and so as to maintain the passage full of material along its operative length;

wherein the passage is of substantially constant transverse cross-sectional flow area along its operative length and the ratio of the dimensions at right angles to one another of successive transverse cross-sectional areas changes cyclically and repeatedly along its operative length from a lower value within a lower range of values to a higher value within a higher range of values, and vice versa, each increase in ratio being accompanied by cold superplastic spreading deformation of the material from a relatively compact mass to a thin sheet form between the closely spaced passage walls, and by pressure induced viscous shear in the thin sheet of moving material, and each decrease in ratio returning the thin sheet of moving material to the form of a relatively compact mass, thereby producing the required mixing and dispersion.

2. Apparatus as claimed in claim 1, wherein the passage includes from 10 to 25 separate successive stages, each stage including an increase of the ratio from a minimum value to a maximum value and an immediately successive decrease of the ratio from the maximum value to a corresponding minimum value.

3. Apparatus as claimed in claim 1, wherein the lower value for the ratio is in the range 5:1 and 30:1, and the higher value is in the range 100:1 to 1,000:1.

4. Apparatus as claimed in claim 1, wherein the body member has a core member extending through at least the operative length of the passage and the passage surrounds the core member to be of corresponding annular shape.

5. Apparatus as claimed in claim 4, wherein the core member is rotatable about a corresponding rotation axis within the passage to induce a minimum shear in the material required for plastic flow thereof and thereby facilitate its flow through the passage under the applied pressure.

6. Apparatus as claimed in claim 5, wherein the core member is rotated at a speed within the range 0.05 to 2000 RPM.

7. Apparatus as claimed in claim 4, wherein the passage is of circular annular cross-section about a longitudinal axis along its operative length with cyclic repeated portions of increased and decreased radius and the core member within the passage is also of circular cross-section along its operative length about the longitudinal axis with cyclic repeated portions of increased and decreased radius that register respectively with the increased and decreased radius passage portions, so that the portions of the annular passage of minimum ratio are formed between the registering portions of the passage and core member of minimum radius, and the portions of the annular passage of maximum ratio are formed between the registering portions of the passage and core member of maximum radius.

8. A method for the mixing and dispersion of flowable materials, the method comprising:

passing the material to be mixed and dispersed through a body member having therein a passage for receiving the flowable material, the passage having an inlet thereto for the material and an outlet therefrom;

the material being moved through the passage under pressure and so as to maintain the passage full of material along its operative length;

the passage being of substantially constant transverse cross-sectional flow area along its operative length and the ratio of the dimensions at right angles to one another of successive transverse cross-sectional areas changing cyclically and repeatedly along its operative length from a lower value within a lower range of values to a higher value within a higher range of values, and vice versa, each increase in ratio being accompanied by cold superplastic spreading deformation of the material from a relatively compact mass to a thin sheet form between the closely spaced passage walls, and by pressure induced viscous shear in the thin sheet of moving material, and each decrease in ratio returning the thin sheet of moving material to the form of a relatively compact mass, thereby producing the required mixing and dispersion.

9. A method as claimed in claim 8, wherein the passage includes from 10 to 25 separate successive stages, each stage including an increase of the ratio from a minimum value to a maximum value and an immediately successive decrease of the ratio from the maximum value to a corresponding minimum value.

10. A method as claimed in claim 8, wherein the lower value for the ratio is in the range 5:1 and 30:1, and the higher value is in the range 100:1 to 1,000:1.

11. A method as claimed in claim 8, wherein the body member has a core member extending through at least the operative length of the passage and the passage surrounds the core member to be of corresponding annular shape.

12. A method as claimed in claim 11, wherein the core member is rotatable about a corresponding rotation axis within the passage to induce a minimum shear in the material and thereby facilitate its flow through the passage under the applied pressure.

13. A method as claimed in claim 12, wherein the core member is rotated at a speed within the range 0.05 to 2000 RPM.

14. A method as claimed in claim 11, wherein the passage is of circular annular cross-section about a longitudinal axis along its operative length with cyclic repeated portions of increased and decreased radius and the core member within the passage is also of circular cross-section along its operative length about the longitudinal axis with cyclic repeated portions of increased and decreased radius that register respectively with the increased and decreased radius passage portions, so that the portions of the annular passage of minimum ratio are formed between the registering portions of the passage and core member of minimum radius, and the portions of the annular passage of maximum ratio are formed between the registering portions of the passage and core member of maximum radius.

* * * * *